(12) United States Patent
Kang (10) Patent No.: US 10,682,279 B2
(45) Date of Patent: *Jun. 16, 2020

(54) SKIN BEAUTY DEVICE HAVING MULTI-FILTER TYPE HOUSING

(71) Applicant: SHENB Co., Ltd., Seoul (KR)

(72) Inventor: Sun Young Kang, Seoul (KR)

(73) Assignee: SHENB CO., LTD., Seoul (KR)

( * ) Notice: Subject to any disclaimer, the term of this patent is extended or adjusted under 35 U.S.C. 154(b) by 320 days.

This patent is subject to a terminal disclaimer.

(21) Appl. No.: 15/730,743

(22) Filed: Oct. 12, 2017

(65) Prior Publication Data

US 2018/0228688 A1 Aug. 16, 2018

(30) Foreign Application Priority Data

Feb. 13, 2017 (KR) .................. 10-2017-0019367

(51) Int. Cl.
*A61H 9/00* (2006.01)
*B01D 46/00* (2006.01)
*B01D 46/10* (2006.01)

(52) U.S. Cl.
CPC .......... *A61H 9/0057* (2013.01); *B01D 46/001* (2013.01); *B01D 46/0012* (2013.01); *B01D 46/10* (2013.01); *A61H 2201/0153* (2013.01); *A61H 2201/1683* (2013.01); *B01D 46/0023* (2013.01); *B01D 2267/40* (2013.01); *B01D 2271/027* (2013.01); *B01D 2273/30* (2013.01); *B01D 2275/202* (2013.01)

(58) Field of Classification Search
CPC .................. A61H 9/0057; A61H 7/008; A61H 2201/1683; A61H 2201/0153; A61H 2201/10; A61H 9/005; A61H 7/00; B01D 46/10; B01D 46/0012; B01D 46/001; B01D 2267/40; B01D 2271/027; B01D 2273/30; B01D 2275/202; B01D 46/0023; A61N 1/403; A61N 1/02; A61M 1/0056; A61M 1/0039; A45D 44/02; A61Q 19/00

See application file for complete search history.

(56) References Cited

U.S. PATENT DOCUMENTS

| 7,578,808 | B2 | 8/2009 | Watanabe |
| 2010/0049177 | A1* | 2/2010 | Boone, III ........... A61H 9/0057 606/9 |
| 2019/0111252 | A1* | 4/2019 | Kang ..................... A61B 18/12 |

FOREIGN PATENT DOCUMENTS

| JP | 3577439 B2 | 10/2004 |
| KR | 20-0456578 Y1 | 11/2011 |
| KR | 20-0480280 Y1 | 5/2016 |
| KR | 10-1639207 B1 | 7/2016 |
| KR | 10-1697334 B1 | 1/2017 |

* cited by examiner

*Primary Examiner* — Timothy A Stanis
*Assistant Examiner* — Arielle Wolff
(74) *Attorney, Agent, or Firm* — Patent Office of Dr. Chung Park (57) ABSTRACT

There is provided a skin beauty device having a multi-filter type housing, wherein even if a fluid remaining on a skin is sucked from the skin beauty device, the sucked fluid is stored in an inner space of the housing and blocked from being transmitted to a suction motor side, and even if some fluid is transmitted to the suction motor side, the housing includes a plurality of filters to prevent the suction motor from being damaged by the suction of the fluid.

4 Claims, 8 Drawing Sheets

FIG. 8

SKIN BEAUTY DEVICE HAVING MULTI-FILTER TYPE HOUSING

BACKGROUND

Field of the Present Disclosure

The present disclosure relates to a skin beauty device having a multi-filter type housing, wherein even if a fluid remaining on a skin of a user is sucked from the skin beauty device, the sucked fluid is stored in an inner space of the housing and blocked from being transmitted to a suction motor side, and even if some fluid is transmitted to the suction motor side, the housing may include a plurality of filters to prevent the suction motor from being damaged by the suction of the fluid.

Discussion of Related Art

In general, there is a growing interest in the development of a beauty device having a vacuum suction function as a beauty device for skin beauty. In particular, recently, the development of a beauty device having both a deep heat function using a high frequency and a vacuum suction function is of interest.

The deep heat generated by the high frequency helps the skin tissue activity, and the suction by the vacuum suction pulls the skin tissue and applies constant shrinkage and relaxation actions to the surrounding connective tissue of a fat tissue to smoothly circulate the lymph, thereby facilitating the discharge of waste matters in the body.

Figure 1:
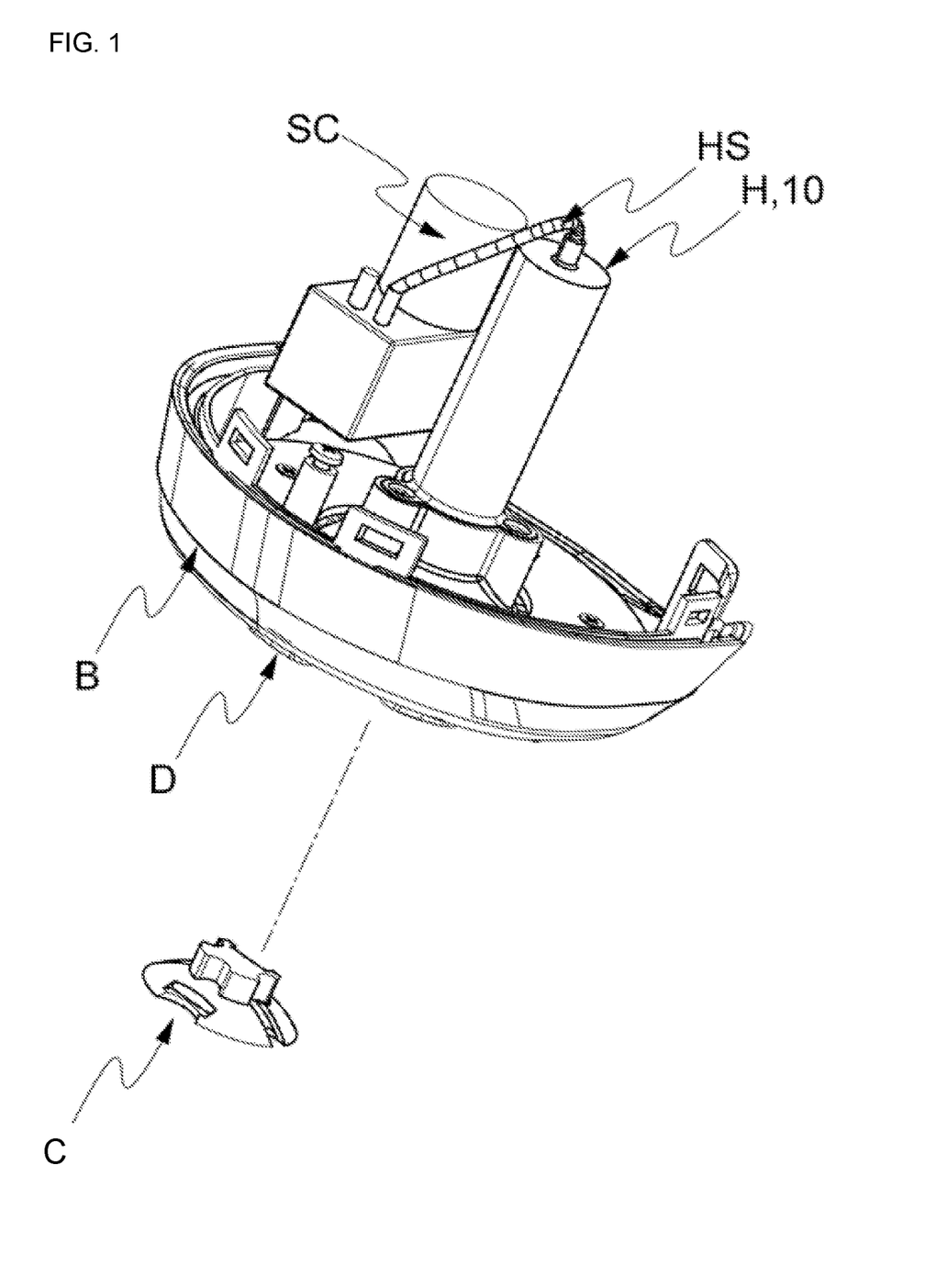
FIG. 1 is an exploded perspective view illustrating a base, a housing and a suction motor together with a separated finishing cap, except for a cover in a skin beauty device according to an embodiment of the present disclosure.

In the related art, it is configured to include a suction motor SC for providing a suction force and a housing H for being vacuumed by the suction motor SC, as partially shown in FIG. 1. The suction motor SC and the housing H are installed on a base B, and electrode pads D for performing a skin cosmetic treatment by a high frequency is provided on the bottom of the base B. The center of the base B penetrates and communicates with the housing H.

The bottom of the base B contacts the skin of the user and a part of the skin is sucked in the direction of the housing H when the inner part of the housing H becomes vacuum by the suction motor SC.

However, in the case of the related art, the fluid such as oil remaining on the skin during suction is also sucked. The sucked fluid is introduced into the suction motor SC side to damage the suction motor SC.

Meanwhile, the skin beauty device of the high frequency system and the skin beauty device itself having the vacuum suction function as described above are well known and are described in detail in the following related art documents, and a description thereof will be omitted.

Disclosure of the Related Art Documents

U.S. Pat. No. 7,578,808
Japanese Patent No. 3577439
Korean Patent No. 10-1639207
Korean Patent No. 10-1697334
Korean Registered Utility Model No. 20-0456578
Korean Registered Utility Model No. 20-0480280

SUMMARY

Thus, the present disclosure provides a skin beauty device having a multi-filter type housing, wherein even if a fluid remaining on a skin of a user is sucked from the skin beauty device, the sucked fluid is stored in an inner space of the housing and blocked from being transmitted to a suction motor side, and even if some fluid is transmitted to the suction motor side, the housing includes a plurality filters to prevent the suction motor from being damaged by the suction of the fluid, thereby maintaining a constant performance.

In one aspect, there is provided a skin beauty device having a multi-filter type housing, the skin beauty device may include a base B having electrode pads D attached to the bottom surface thereof, a housing 10 communicating with a section hole SH of the base B, and a suction motor SC provided at one side of the base B and connected to the housing 10, wherein the housing 10 may include a connection housing 300 inserted into the suction hole SH, a filter housing 200 inserted into the connection housing 300 and having a filter built therein, and a guide housing 100 in which the connection housing 300 and the filter housing 200 are accommodated, and wherein a perforated tube B1 extending in the height direction of the base B may be formed around the suction hole SH and the guide housing 100 may be coupled to the perforated tube B1.

In one embodiment, the connection housing 300 may include a hollow connection body 310 in which the upper portion is opened and the lower portion is closed and the filter housing 200 is disposed therein, a suction port 320 extending downward at the center of the bottom surface of the connection body 310, having a smaller diameter than the connection body 310 and a hollow shape, and communicating with the inner part of the connection body 310, and a guide panel 330 extending downward at one side of the bottom surface of the connection body 310, having a plate shape and extending to the inner part of the suction hole SH, wherein the fluid that has passed through the section hole SH may be stored in an inner space of the guide housing 100 and the air may be sucked into the connection body 310 through the suction port 320.

In one embodiment, a first O-ring O1 may be provided on the outer surface of the connection body 310 and a second O-ring O2 may be provided on the inner surface of the connection body 310.

In one embodiment, the filter housing 200 may include a filter mounting portion 210 disposed in the connection body 310 of the connection housing 300, a Teflon filter 220 disposed on the top surface of the filter mounting portion 210, and a non-woven fabric filter 230 disposed in the filter mounting portion 210, wherein the filter mounting portion 210 may include a mounting portion body 211 having a hollow shape in which an upper portion is closed and a lower portion is opened, a through-hole 211a may be formed on a top surface of the mounting portion body 211, the Teflon filter 220 may be disposed on the through-hole 211a, and the lower portion of the mounting portion body 211 may be communicated with an inner part of the connection housing 300.

In one embodiment, the guide housing 100 may include a guide body 110 having a hollow shape in which an upper portion is closed and a lower portion is opened, a final air inlet 120 extending upward from an upper surface of the guide body 110, and a ring-shaped holding ring (or shortly holding ring) 130 protruding outwardly from the guide body 110, wherein the lower portion of the guide body 110 may be communicated with the suction hole SH of the base B.

In one embodiment, a plurality of ring-shaped receiving walls B3 may be formed at predetermined intervals in the circumferential direction around the perforated tube B1 in which the suction hole SH is formed, and a circular arc wall B2 of an arc shape having a specific curvature is connected between the receiving walls B3 in a circumferential direction, wherein the holding ring 130 may be seated in the receiving wall B3, and a protrusion 140 may be seated between the circular arc wall B2 and the perforated tube B1.

According to the embodiments of the present disclosure, there is provided a skin beauty device having a multi-filter type housing, wherein even if a fluid remaining on a skin of a user is sucked from the skin beauty device, the sucked fluid is stored in an inner space of the housing and blocked from being transmitted to a suction motor side, and even if some fluid is transmitted to the suction motor side, the housing may include a plurality of filters to prevent the suction motor from being damaged by the suction of the fluid.

BRIEF DESCRIPTION OF THE DRAWINGS

The embodiments of the present disclosure will become more apparent from the following detailed description based on the accompanying drawings.

DETAILED DESCRIPTIONS

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

According to an embodiment of the present disclosure, as shown in FIG. 1, a skin beauty device includes a base B having electrode pads D attached to the bottom surface thereof, a housing 10 communicating with a section hole SH of the base B and a suction motor SC provided at one side of the base B and connected to the housing 10. The housing 10 and the suction motor SC are connected by a connection hose HS, which is the same as that of the related art, and thus, the description and illustration thereof will be omitted.

Figure 2:
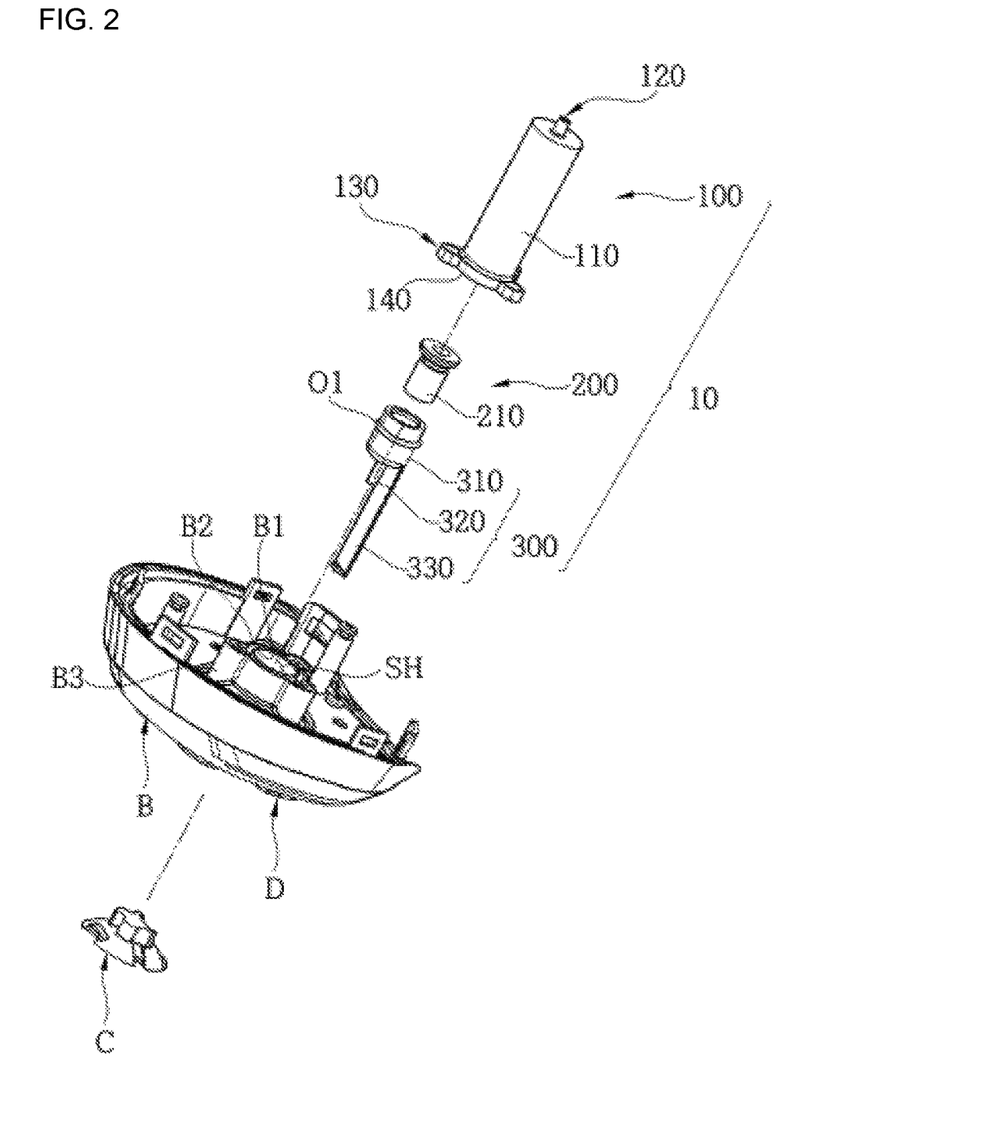
FIG. 2 and FIG. 3 are an exploded perspective view and an exploded cross-sectional perspective view illustrating the base and the housing, respectively, in the skin beauty device according to an embodiment of the present disclosure.
Figure 3:
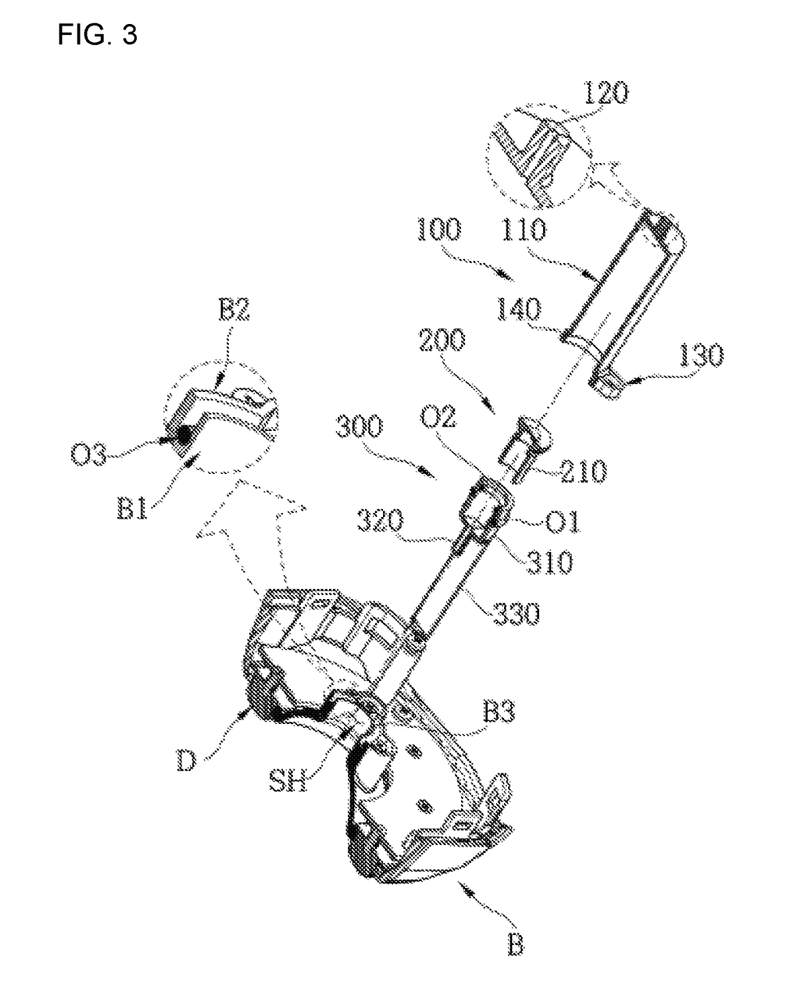

According to an embodiment of the present disclosure, the housing 10 includes a connection housing 300 inserted into the suction hole SH, a filter housing 200 inserted into the connection housing 300 and having a filter built therein, and a guide housing 100 in which the connection housing 300 and the filter housing 200 are accommodated. That is, as described above, even if a fluid remaining on a skin of the user is sucked from the skin beauty device, the sucked fluid is stored in an inner space of the guide housing 100 and blocked from being transmitted to a suction motor SC side to prevent damage to the suction motor SC, and even if some fluid is transmitted to the suction motor side, filters are provided in the filter housing 200 to completely block the fluid, thereby basically preventing damage to the suction motor SC As shown in FIGS. 2 and 3, a perforated tube B1 extending in the height direction of the base B is formed around the suction hole SH. That is, the perforated tube B1 is provided on the base B and an inner space thereof becomes a suction hole SH (see FIGS. 2 and 3). In this case, the guide housing 100 is coupled to the perforated tube B1.

That is, when the guide housing 100 is coupled to the perforated tube B1, the connection housing 300 and the filter housing 200 are communicated with the suction hole SH. This will be described in more detail with reference to FIG. 2 to FIG. 7.

The connection housing 300 is inserted into the guide housing 100 and the filter housing 200 is inserted into the connection housing 300.

Figure 7:
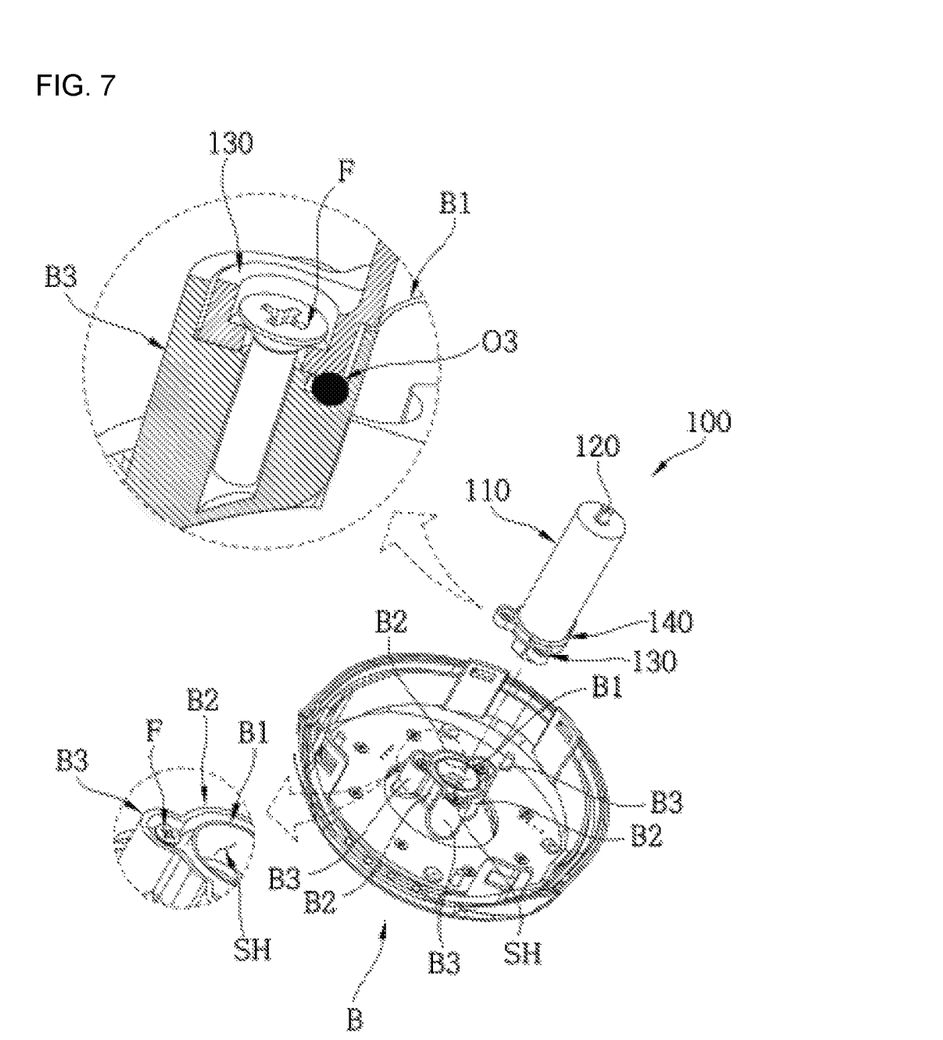
FIG. 7 is a partially enlarged view and a perspective view illustrating an engaging relation between the base and a guide housing in the skin beauty device according to an embodiment of the present disclosure.

As shown in FIG. 7, the guide housing 100 includes a guide body 110 having a hollow shape in which the upper portion is closed and the lower portion is opened, a protrusion 140 protruding around the lower portion of the guide body 110, and a ring-shaped holding ring 130 protruding outwardly on the protrusion 140. In this case, a final air inlet 120 is formed on the upper surface of the guide body 110. The final air inlet 120 is communicated with an inner part of the guide body 110 as a hollow shape.

That is, the guide body 110 is provided in the perforated tube B1 and the suction hole SH and the inner part of the guide body 110 communicate with each other. In this case, as described above, since the filter housing 200 and the connection housing 300 are provided in the guide body 110, the filter housing 200 and the connection housing 300 are communicated with the suction hole SH. In this case, the protrusion 140 has an annular shape and is formed around the guide body 110. The holding ring 130 protrudes outwardly from the protrusion 140.

That is, the air sucked through the suction hole SH flows to the suction motor SC through the filter housing 200 and the connection housing 300 and through the final air inlet 120 of the guide housing 100. The fluids such as oil remaining on the skin of the user are stored in the guide housing 100 and are blocked from being sucked into the suction motor, which will be described later.

As shown in FIG. 7, a plurality of ring-shaped receiving walls B3 is be formed at predetermined intervals in the circumferential direction around the perforated tube B1 in which the suction hole SH is formed, and a circular arc wall B2 of an arc shape having a specific curvature is connected between the receiving walls B3 in a circumferential direction. That is, since the circular arc wall B2 is formed around the perforated tube B1, the diameter of the circular arc wall B2 is larger than that of the perforated tube B1. The receiving wall B3 has a ring shape as shown in the figure, and a plurality of receiving walls B3 are circumferentially provided around the circular arc wall B2, and are spaced apart from each other at regular intervals.

The holding ring 130 is seated in the receiving wall B3, and the protrusion 140 is seated between the circular arc wall B2 and the perforated tube B1. A known fastener F is provided on the bottom of the receiving wall B3 after passing through the holding ring 130. With this configuration, the guide housing 100 and the base B are fixed.

The connection housing 300 is disposed in the filter housing 200 and the connection housing 300 itself is disposed in the guide housing 100.

Figure 5:
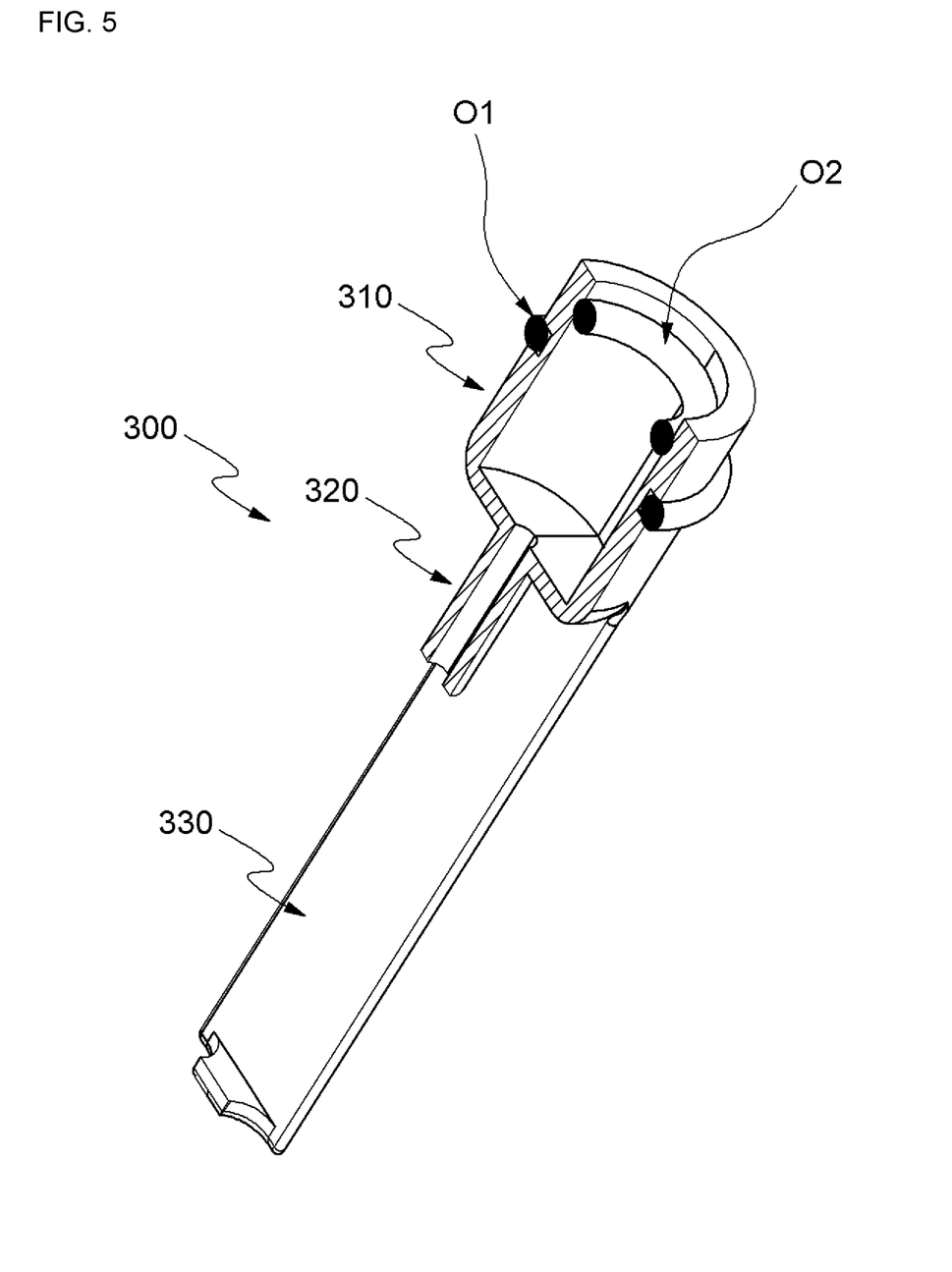
FIG. 5 is a cross-sectional perspective view illustrating a connection housing in the skin beauty device according to an embodiment of the present disclosure.

The connection housing 300 includes a hollow connection body 310 in which the upper portion is opened and the lower portion is closed and the filter housing 200 is disposed therein, a suction port 320 which is downwardly extended at the center of the bottom surface of the connection portion body 310 wherein the suction port 320 has a hollow shape and a diameter smaller than that of the connection part body 310 and which is communicated with the inner part of the connection part body 310, a guide panel 330 which is downwardly extended on one side of the bottom surface of the connection part body 310 and has a plate shape.

The suction port 320 has a small diameter, which is much smaller than that of the connection body 310. Therefore, only air in the air and fluid sucked into the guide housing 100 through the suction hole SH is sucked through the suction port 320 and is transmitted through the final air suction port 120 of the guide housing 100 to the suction motor side.

However, since the fluid is hardly sucked toward the suction port 320, the fluid is stored in the connection housing 300 and the inner space of the guide housing 100 to block the fluid from being transmitted to the suction motor side. This is because the suction port 320 has a narrow diameter and extends downward as described above. However, a part of the fluid may be sucked through the suction port 320, but in such a case, a filter is provided in the filter housing 200 to basically prevent the fluid from being sucked into the suction motor side.

The guide panel 330 has a plate shape and extends downward into the suction hole SH. The guide panel 330 guides the flow of the fluid and air so that more fluid and air can be introduced into the inlet port 320.

A first O-ring O1 is provided on the outer surface of the connection body 310 and a second O-ring O2 is provided on the inner surface of the connection body 310. The air tightness between the outer surface of the connecting body 310 and the inner surface of the guide body 110 can be maintained by the first O-ring O1. The air tightness between the inner surface of the connecting body 310 and the outer surface of the filter housing 200 described later can be maintained by the first O-ring O1.

Figure 4:
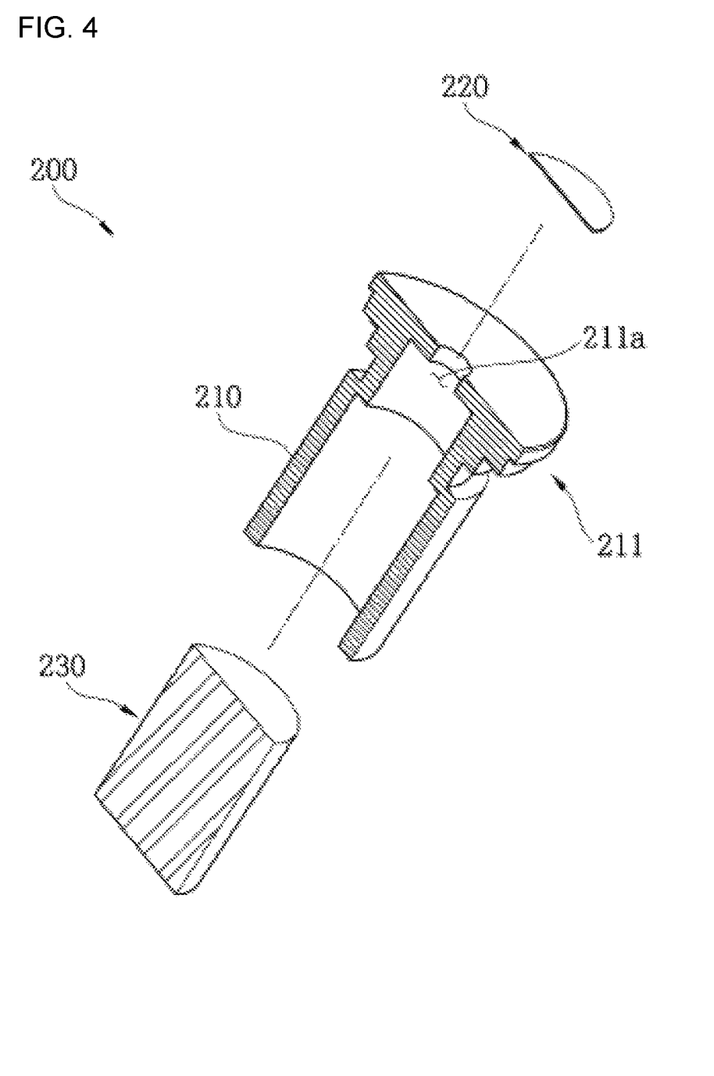
FIG. 4 is an exploded cross-sectional perspective view illustrating a filter housing in the skin beauty device according to an embodiment of the present disclosure.

The filter housing 200 includes a filter mounting portion 210 disposed in the connection body 310 of the connection housing 300, a Teflon filter 220 disposed on the top surface of the filter mounting portion 210, and a non-woven fabric filter 230 disposed in the filter mounting portion 210. In this case, the filter mounting portion 210 may consist of a mounting portion body 211 having a hollow shape, the upper surface being closed and the lower side being opened. A through hole 211a is formed on the upper surface of the mounting portion main body 211. In addition, the Teflon filter 220 is disposed on the through hole 211a and the lower portion of the mounting portion body 211 is communicated with the inner part of the connection housing 300.

A non-woven fabric filter 230 is provided in the mounting portion body 211 and a Teflon filter 220 is provided on the upper surface of the mounting portion body 211. Accordingly, the air and the fluid introduced into the connection body 310 of the connection housing 300 are primarily passed through the non-woven fabric filter 230. By the non-woven fabric filter 230, the air passes but the fluid such as oil does not pass and is blocked.

Meanwhile, a through hole 211a is formed on an upper surface of the mounting body 211 and the Teflon filter 220 is disposed on an upper surface of the through hole 211a. Accordingly, the air that has passed through the non-woven fabric filter 230 and the fluid such as oil that has not been blocked can pass through the Teflon filter 220 after passing through the through hole 211a. The air passes through the Teflon filter 220 but the fluid such as oil cannot pass through the Teflon filter 220 and is completely blocked. In this case, the Teflon filter 220 can be made of a porous material that can easily permeate air.

According to the embodiments of the present disclosure, the fluid such as oil is completely blocked to protect the suction motor SC. Of course, even if the skin beauty device of the present disclosure is flipped or shaken by the user after using of the skin beauty device, the fluid such as oil is stored in the guide housing 100 as described above and is blocked from being sucked toward the suction motor SC side, and thus, the suction motor SC can be safely protected.

Figure 8:
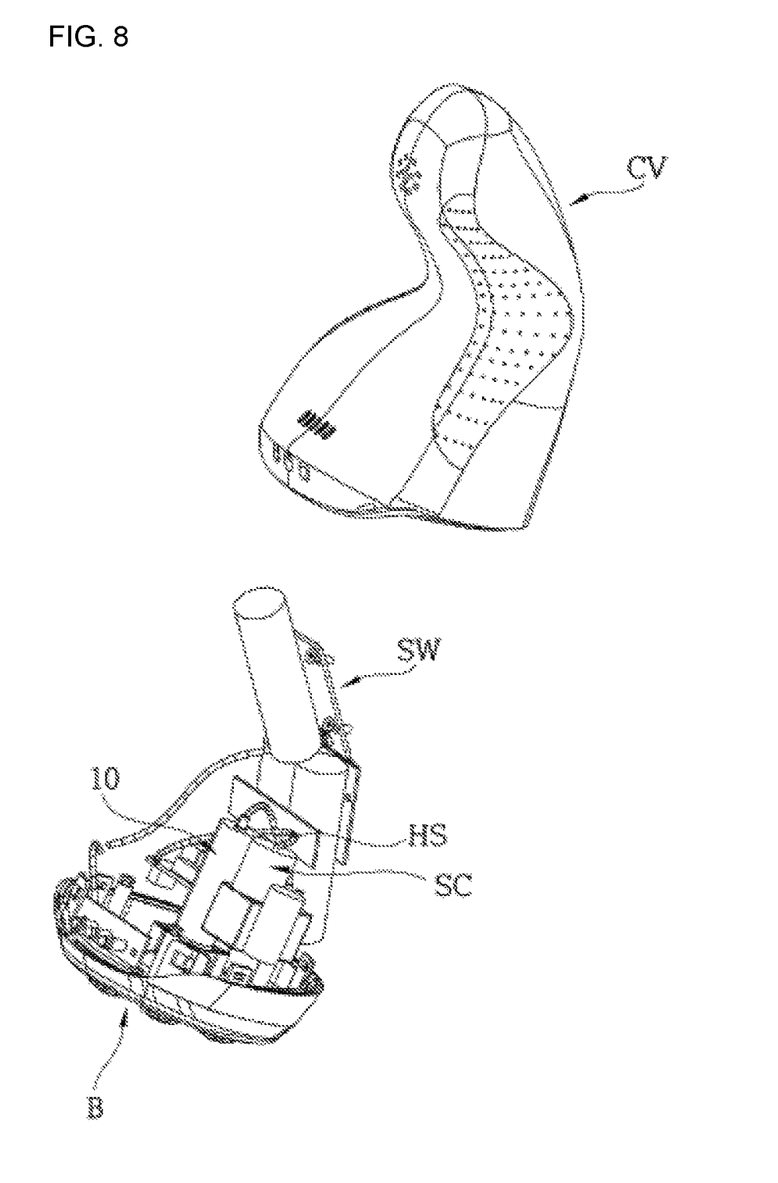
FIG. 8 is an exploded perspective view illustrating the base and the cover in the skin beauty device according to an embodiment of the present disclosure.

As shown in FIG. 8, the housing 10 and the suction motor SC described above may be mounted on the base B and a cover CV may be provided on the base B. At this case, a switch SW may be provided in the cover CV. The structure of the cover CV and the switch SW can be applied by the related art, and therefore, a detailed description thereof will be omitted.

In addition, the perforated tube B1 of the base B can be sealed by the finishing cap C.

Figure 6:
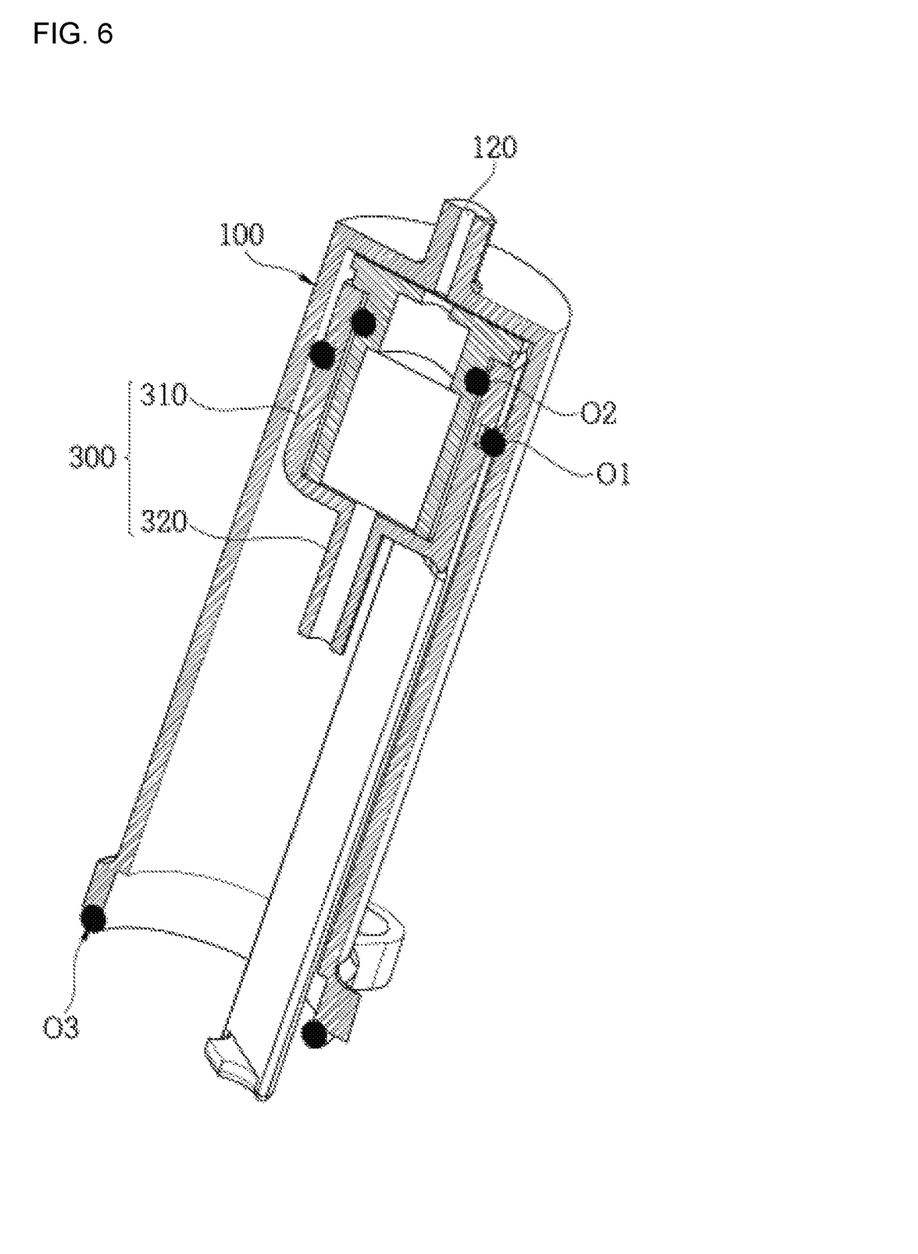
FIG. 6 is a cross-sectional perspective view illustrating an engaging section of the housing in the skin beauty device according to an embodiment of the present disclosure.

As shown in FIGS. 6 and 7, a third O-ring O3 may be provided between the bottom surface of the holding ring 130 of the guide housing 100 and the bottom surface of the receiving wall B3 to achieve more complete sealing.

| Reference numerals | |
|---|---|
| 100: guide housing | 110: guide body |
| 120: final air inlet | 130: holding ring |
| 200: filter housing | 210: filter mounting portion |
| 211: mounting portion body | 211a: through-hole |
| 220: Teflon filter | 230: non-woven fabric filter |
| 300: connection housing | 310: connection body |
| 320: suction port | 330: guide panel |
| B: Base | O2: O-ring |
| B1: tube | SW: switch |
| CV: cover | 140: Protrusion |
| O1: O-ring | D: electrode pads |
| SH: suction hole | B3: receiving wall |
| H, 10: housing | HS: connection hose |
| C: cap | O3: O-ring |
| B2: circular arc wall | SC: suction motor |
| F: fastener | |

What is claimed is:

1. A skin beauty device having a housing that houses multiple filters, comprising: a base having a dozer an electrode pad attached to a bottom surface the base; a tube extending in a height direction of the base and defining a suction hole of the base a housing in fluid communication with the suction hole of the base; and a suction motor provided at one side of the base and connected to the housing, wherein the housing comprises a connection housing inserted into the suction hole, a filter housing inserted into the connection housing and having a filter built therein, and a guide housing in which the connection housing and the filter housing are accommodated, wherein the guide housing is coupled to the tube, wherein the guide housing comprises a guide body having a hollow shape in which an upper portion is closed and a lower portion is opened, a final air inlet extending upward from an upper surface of the guide body, and a holding ring protruding outwardly from the guide body, wherein the lower portion of the guide body is in fluid communication with the suction hole of the base, wherein a plurality of ring-shaped receiving walls are formed at predetermined intervals in a circumferential direction around the tube, and a circular arc wall of an arc shape having a specific curvature is connected between the plurality of ring-shaped receiving walls in a circumferential direction, and wherein the holding ring is seated in the plurality of ring-shaped receiving walls, and a protrusion is seated between the circular arc wall and the tube.

2. The skin beauty device according to claim 1, wherein the connection housing comprises:
    a hollow connection body in which an upper portion is opened and a lower portion is closed and the filter housing is disposed therein;
    a suction port extending downward at a center of a bottom surface of the hollow connection body, having a smaller diameter than the hollow connection body, having a hollow shape, and being in fluid communication with an inner part of the hollow connection body; and
    a guide panel extending downward at one side of the bottom surface of the hollow connection body and extending to an inner part of the suction hole of the base,
    wherein a fluid that has passed through the suction hole of the base is stored in an inner space of the guide housing and the suction port is configured such that the fluid is sucked through into the hollow connection body.

3. The skin beauty device according to claim 2, further comprising:
    a first O-ring (O1) provided on an outer surface of the hollow connection body; and
    a second O-ring (O2) provided on an inner surface of the hollow connection body.

4. The skin beauty device according to claim 1, wherein the filter housing comprises a filter mounting portion disposed in the hollow connection body of the connection housing, a top filter disposed on a top surface of the filter mounting portion, and a non-woven fabric filter disposed in the filter mounting portion,
    wherein the filter mounting portion comprises a mounting portion body having a hollow shape in which an upper portion is closed and a lower portion is opened,
    wherein a through-hole is formed on a top surface of the mounting portion body, the top filter is disposed on the through-hole, and
    wherein the lower portion of the mounting portion body is in fluid communication with an inner part of the connection housing.

* * * * *